H. A. WALKER.
SAFETY BRAKE MECHANISM FOR MINE CAGES AND THE LIKE.
APPLICATION FILED MAR. 24, 1908.

902,703.

Patented Nov. 3, 1908.

Witnesses:   Inventor
   Henry Alford Walker

UNITED STATES PATENT OFFICE.

HENRY ALFORD WALKER, OF JOHANNESBURG, TRANSVAAL, ASSIGNOR OF ONE-HALF TO WALTER GEORGE COMPTON, OF JOHANNESBURG, TRANSVAAL.

SAFETY BRAKE MECHANISM FOR MINE-CAGES AND THE LIKE.

No. 902,703.  Specification of Letters Patent.  Patented Nov. 3, 1908.

Application filed March 24, 1908. Serial No. 423,052.

*To all whom it may concern:*

Be it known that I, HENRY ALFORD WALKER, a subject of the King of Great Britain, and resident of Johannesburg, Transvaal, have invented certain new and useful Improvements in Safety Brake Mechanism for Mine-Cages and the Like, of which the following is a specification.

This invention relates to safety brake mechanism primarily designed for the skips, cages, and other vehicles employed in the shafts of mines.

The invention may also be adapted for use with the cars or other vehicles of hoists, lifts, elevators and like hoisting apparatus in which the hoistway or well is equipped with runners, skids, or guides traversed by the vehicle in its ascent and descent. It may be applied to wood, steel, or other metal runners and be adapted for use in inclined or vertical, or compound (combined inclined and vertical) shafts.

The invention has for its object to provide safety brake mechanism which may be relied upon under all ordinary circumstances in the event of breakage of the winding or hoisting rope or other part of the suspension gear, to retard and ultimately arrest the movement of the falling vehicle without transmitting injurious shocks to the occupants thereof, or without materially damaging the vehicle or the runners, skids or guides, dividers or other shaft timbers. To the attainment of this object my invention consists in providing the cage or other vehicle preferably in its upper portion with a frame pivoted to the vehicle at one side, carrying wheels which are adapted in the event of the breakage of the rope or suspension gear, to have frictional contact with the runners, skids or guides. These wheels rotate a worm (or worms) which in turn rotates a worm wheel (or worm wheels) actuating a screw threaded shaft (or shafts). The screw-threaded shaft (or shafts) actuates a brake beam or bar which in turn moves brake members into contact with the sides of the runners to automatically apply a gradually increasing brake pressure between the aforementioned wheels and brake members to retard and ultimately arrest the movement of the falling vehicle.

The invention will be more fully described by aid of the accompanying drawing, in which by way of example it is shown designed for application to a mine cage for use in a mine shaft equipped with steel or other metal or wood runners.

Figures 3, 4:
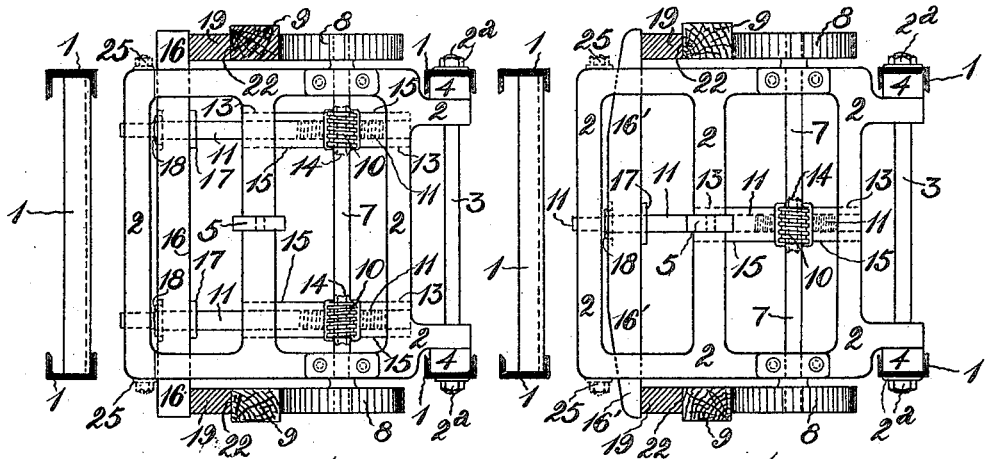
Figures 1, 2:
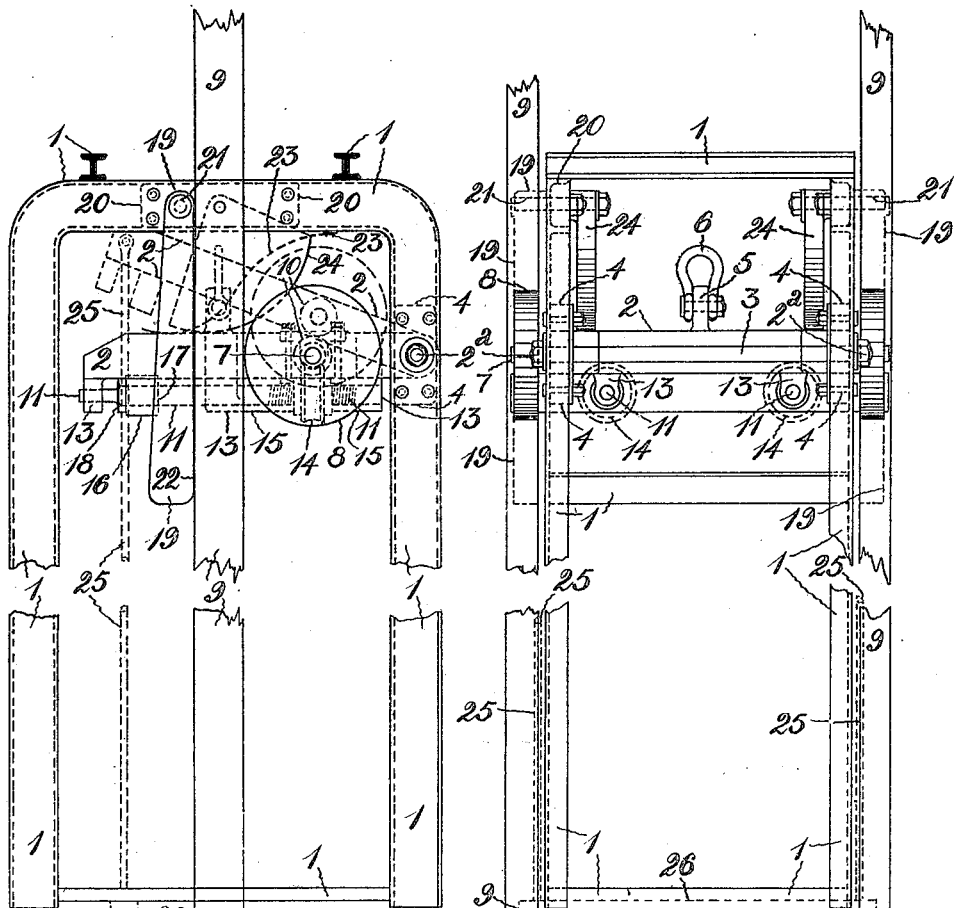

Figure 1 represents a side elevation of the framework of the cage with the safety brake mechanism arranged in the upper portion thereof. Fig. 2 is an elevation at right angles to Fig. 1. Fig. 3 is a sectional plan with the blocks or tumblers and springs removed. Fig. 4 is a plan illustrating a modified form of the invention.

Referring more particularly to the arrangement illustrated in Figs. 1, 2 and 3, the safety brake mechanism is shown arranged in the upper portion of the framework 1 of the cage or vehicle. The framework 1 is shown consisting of channel irons although it may be built of any other suitable section or sections.

2 is the frame which is pivoted on a horizontally disposed rod 3 secured between two opposite members of the framework 1 by the nuts and washers $2^a$, 4 being blocks secured to the channel irons to support the rod 3.

The frame 2 is constructed or provided with an eyepiece 5 for making connection with the ordinary shackle 6—see Fig. 2—to which the hauling rope is attached in any ordinary or suitable manner. In the frame 2 is journaled a horizontal shaft 7, the extremities of which project beyond the sides of the frame 2 and have keyed or otherwise suitably fixed thereto wheels 8 which in the normal running of the vehicle are clear of the guides or runners 9 but are adapted as hereinafter described to have frictional contact with the sides of said runners 9 in the event of the vehicle becoming unsupported. These wheels 8 may be constructed plain on the periphery as shown or be serrated, fluted, toothed or spiked, to insure their rotation when they are brought into contact with the sides of the runners 9. The horizontal shaft 7 is provided with two worms or screw-threaded portions 10. 11 are two screws or screw-threaded shafts (revolubly supported in lugs 13 formed on the three parallel members of the frame 2) at right angles to and beneath the shaft 7. The screws 11 are located beneath the worms 10 and on them are mounted worm wheels 14 with which the worms 10 mesh or gear. The worm wheels 14 are constructed with an internal screw-thread corresponding in shape and pitch to the screws 11. 15 may represent tubular distance pieces (or extensions of the lugs) between the lugs 13 and worm wheels 14 to prevent movement of the latter longitudinally of the screws 11 and to maintain them in correct position in gear with the worms 10. 16 is a beam or bar carried by the screw-threaded shafts 11, 17 representing collars fixed to the screw-threaded shafts and 18 nuts for retaining the bar 16 next the collars.

To the upper portion of the framework 1 of the cage are pivoted vertically disposed preferably wedge shaped brake members 19 arranged on the opposite sides of the runners 9 to the wheels 8, 20 being blocks fixed in the framework 1 to support the hinge or pivot pins 21 of said brake members.

The brake members 19 are made of a sufficient length to provide the requisite area of frictional contact between said brake members and the runners 9 and if preferred the faces 22 adapted to contact with the runners may be serrated, toothed or otherwise formed to increase the frictional resistance.

23 in Fig. 1 represents a laminated spring, bolted or otherwise suitably fixed at one extremity to the upper transverse member of the framework 1, and resting at the other end upon the frame 2. Two such springs are preferably provided one located at each side. These springs 23 serve for forcing down the frame 2 into its operative position on the breaking of the hauling rope. I also preferably provide at the same sides of the frame 2 a block or tumbler 24 which as shown in Fig. 1 assumes such a position when the frame 2 falls, as to prevent the release of the brake mechanism or to maintain it in its operative position.

For the purpose of preventing the brake mechanism coming into operation in the event of the cage being lowered on to stops or other similar temporary obstructions in the shaft, I may provide two rods 25 pivotally connected at their upper extremities to two opposite sides of the frame 2. These rods 25 extend in a downward direction and are connected at their lower ends by a transverse piece 26 which is adapted to come into contact with the stops and to support the frame 2 when the cage is supported and the rope slackens.

The arrangement above described is that preferred for use on vehicles employed in shafts equipped with steel or other metal runners or when the sides of the runners present a substantially continuous and even surface.

In Fig. 4 I show the arrangement preferred when the shaft is equipped with wood runners or when the sides of the runners do not present a substantially continuous and even surface to be engaged by the wheels 8 and brake members 19. In this case the shaft 7 is preferably provided with only one worm 10 and one screw 11 and worm wheel 14 only are provided for actuating the beam or bar 16′ and brake members 19. In all other respects the arrangement is the same as that described in connection with Figs. 1 to 3.

If the mechanism is located on the top of the cage then a bonnet or cover is preferably provided arranged over the brake mechanism, to serve as a protection therefor.

The operation of the mechanism is as follows:—In the normal running of the vehicle or when the weight thereof is carried by the hauling rope and the latter is in tension, the frame 2 is raised about the rod 3 into the position in which it is shown in dotted lines in Fig. 1, or with the outer and free end engaging the underside of the top transverse member of the framework 1. The springs 23 are in compression and the wheels 8 and brake members 19 are clear of the runners 9. The mechanism remains in its inoperative position so long as the frame 2 is held in the position shown in dotted lines. In the event of breakage of the winding or hoisting rope or of the cage becoming unsupported the springs 23 immediately force the frame 2 into the position in which it is shown in full lines in Figs. 1, 2 and 3, which movement brings the peripheries of the wheels 8 into contact with the sides of the runners 9. When the frame 2 falls the tumblers or blocks 24 assume the position shown in Fig. 1 and prevent upward movement of the frame. The wheels 8 are then rotated by their frictional contact with the sides of the runners 9 which by rotating the worms 10 and worm wheels 14 move the screw-threaded shafts 11 through the worm wheels 14. The shafts 11 carry with them the beam or bar 16 and the latter comes into contact with the two brake members 19 and forces them into contact with the runners 9 on the opposite sides to the wheels 8. As the beam or bar 16 advances the brake pressure exerted between the brake members 19 and wheels 8 is gradually increased until the downward movement of the vehicle is arrested.

To release the brake mechanism the nuts 18 are slackened which allows the bar or beam 16 to move away from the brake members 19, and the rope having been attached, the frame is raised and the parts then readjusted.

What I claim as my invention and desire to protect by Letters Patent is:—

1. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, a worm on said shaft, a worm wheel in gear with said worm, a second shaft moved by said worm wheel, a beam fixed to the second shaft on the opposite side of the guides to the friction wheels, and brake members pivoted to the vehicle and adapted to be moved by the beam into contact with the guides on the opposite sides to the friction wheels, as set forth.

2. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, worms on said shaft, worm wheels in gear with said worms, a pair of parallel shafts moved by the worm wheels, a beam fixed to the latter shafts on the opposite side of the guides to the friction wheels, and brake members pivoted to the vehicle separate from and adapted to be moved by the beam into contact with the guides on the opposite sides to the friction wheels, as set forth.

3. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, a worm on said shaft, a worm wheel in gear with said worm, a second shaft moved by said worm wheel, a beam fixed to the second shaft on the opposite side of the guides to the friction wheels, brake members pivoted to the vehicle and adapted to be moved by the beam into contact with the guides on the opposite sides to the friction wheels, a spring which serves for moving the pivoted frame in a downward direction in the event of the vehicle becoming unsupported, and means for preventing upward movement of the frame after it has been lowered into its operative position.

4. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, worms on said shaft, worm wheels in gear with said worms, a pair of parallel shafts moved by the worm wheels, a beam fixed to the latter shafts on the opposite sides of the guides to the friction wheels, brake members pivoted to the vehicle separate from and adapted to be moved by the beam into contact with the guides on the opposite sides to the friction wheels, a spring which serves for moving the pivoted frame in a downward direction in the event of the vehicle becoming unsupported, and means for preventing upward movement of the frame after it has been lowered into its operative position, as set forth.

5. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, a worm on said shaft, a worm wheel in gear with said worm, a second shaft moved by said worm wheel, a beam fixed to the second shaft on the opposite side of the guides to the friction wheels, brake members pivoted to the vehicle and adapted to be moved by the beam into contact with the guides on the opposite sides to the friction wheels, and means for retaining the frame in its inoperative position when the vehicle is lowered on to stops in the shaft.

6. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, worms on said shaft, worm wheels in gear with said worms, a pair of parallel shafts moved by the worm wheels, a beam fixed to the latter shafts on the opposite side of the guides to the friction wheels, brake members pivoted to the vehicle separate from and adapted to be moved by the beam into contact with the guides on the opposite sides to the friction wheels, and means for retaining the frame in its inoperative position when the vehicle is lowered on to stops in the shaft.

7. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, a worm on said shaft, a worm wheel in gear with said worm, a second shaft moved by said worm wheel, a beam fixed to the second shaft on the opposite side of the guides to the friction wheels, brake members pivoted to the vehicle and adapted to be moved by the beam into contact with the guides on the opposite sides to the friction wheels, a spring fixed to the frame of the vehicle and engaging the pivoted frame and adapted to move the frame in a downward direction when the vehicle becomes unsupported through breakage of the suspension gear, and a tumbler pivoted to the frame of the vehicle and adapted to engage the pivoted frame to prevent upward movement thereof after it has been lowered into its operative position by the spring, as set forth.

8. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, worms on said shaft, worm wheels in gear with said worms, a pair of parallel shafts moved by the worm wheels, a beam fixed to the latter shafts on the opposite side of the guides to the friction wheels, brake members pivoted to the vehicle separate from and adapted to be moved by the beam into contact with the guides on the opposite sides to the friction wheels, a spring fixed to the frame of the vehicle and engaging the pivoted frame and adapted to move the frame in a downward direction when the vehicle becomes unsupported through breakage of the suspension gear, and a tumbler pivoted to the frame of the vehicle and adapted to engage the pivoted frame to prevent upward movement thereof after it has been lowered into its operative position by the spring, as set forth.

9. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, a worm on said shaft, a worm wheel in gear with said worm, a second shaft moved by said worm wheel, a beam fixed to the second shaft on the opposite side of the guides to the friction wheels, brake members pivoted to the vehicle and adapted to be moved by the beam into contact with the guides on the opposite sides to the friction wheels, a spring fixed to the frame of the vehicle and engaging the pivoted frame and adapted to move the frame in a downward direction when the vehicle becomes unsupported through breakage of the suspension gear, and a tumbler pivoted to the frame of the vehicle and adapted to engage the pivoted frame to prevent upward movement thereof after it has been lowered into its operative position by the spring, and means for retaining the pivoted frame in its inoperative position when the vehicle is lowered on to stops in the shaft, said means comprising rods pivoted to the free end of the frame and a transverse member connecting said rods beneath the vehicle.

10. Safety brake mechanism such as described comprising a vehicle, guiding means therefor, a frame pivoted to said vehicle, means attached to said frame for suspending the vehicle, a shaft revolubly supported by said frame, friction wheels fixed to said shaft and adapted to have contact with the guides when the vehicle is unsupported, worms on said shaft, worm wheels in gear with said worms, a pair of parallel shafts moved by the worm wheels, a beam fixed to the latter shafts on the opposite side of the guides to the friction wheels, brake members pivoted to the vehicle separate from and adapted to be moved by the beam into contact with the guides on the opposite sides to the friction wheels, a spring fixed to the frame of the vehicle and engaging the pivoted frame and adapted to move the frame in a downward direction when the vehicle becomes unsupported through breakage of the suspension gear, a tumbler pivoted to the frame of the vehicle and adapted to engage the pivoted frame to prevent upward movement thereof after it has been lowered into its operative position by the spring, and means for retaining the pivoted frame in its inoperative position when the vehicle is lowered on to stops in the shaft, said means comprising rods pivoted to the free end of the frame and a transverse member connecting said rods beneath the vehicle.

11. Safety brake mechanism such as described comprising in combination, a vehicle, guiding and suspension means therefor, a rod fixed to one side of the vehicle, a frame pivotally supported at one side upon said rod, a shaft journaled in the frame parallel with the aforementioned rod, friction wheels fixed to the extremities of said shaft, said wheels being adapted to come into contact with the sides of the guides when the frame is lowered, a worm on said shaft, a screw-threaded shaft revolubly supported in the underside of the pivoted frame beneath the worm and at right angles to the first mentioned shaft, a worm wheel in gear with the worm and mounted on the screw-threaded shaft and provided with an internal thread corresponding to the threaded portion of said shaft, means for maintaining the worm wheel in gear with the worm, a beam fixed to the screw-threaded shaft parallel with the shaft carrying the friction wheels, a pair of brake members pivoted to the frame of the vehicle on the sides of the guides opposite the friction wheels, with which brake members the aforementioned beam is adapted to engage when the screw-threaded shaft is actuated through the worm wheel, worm and friction wheels to apply a gradually increasing brake pressure on the guides between the friction wheels and brake members, as set forth.

12. Safety brake mechanism such as described comprising in combination a vehicle, guiding and suspension means therefor, a rod fixed to one side of the vehicle, a frame pivotally supported at one side upon said rod, a shaft journaled in the frame parallel with the aforementioned rod, friction wheels fixed to the extremities of said shaft, said wheels being adapted to come into contact with the sides of the guides when the frame is lowered, worms on said shaft, a pair of screw-threaded shafts revolubly carried by the pivoted frame on the underside beneath the worms and at right-angles to the first mentioned friction wheel shaft, a pair of worm wheels in gear with the worms and mounted on the screw-threaded shafts and provided with internal threads corresponding to the threaded portions of said shafts, means for maintaining the worm wheels in gear with the worms, a beam fixed to the screw-threaded shafts and parallel with the shaft carrying the friction wheels, a pair of brake members pivoted to the frame of the vehicle on the sides opposite the friction wheels, with which brake members the aforementioned beam is adapted to engage when the screw-threaded shafts are actuated through the worm wheels, worms and friction wheels to apply a gradually increasing brake pressure on the guides between the friction wheels and brake members, as set forth.

In witness whereof I have hereunto set my hand in the presence of two subscribing witnesses.

HENRY ALFORD WALKER.

Witnesses:
   CHAS. OVENDALE,
   R. OVENDALE.